Patented Dec. 16, 1947

UNITED STATES PATENT OFFICE 2,432,517

CELLULOSE COMPOUND COMPOSITION CONTAINING A PRESERVATIVE

Henry Dreyfus, London, England; Claude Bonard administrator of said Henry Dreyfus, deceased No Drawing. Application November 18, 1943, Serial No. 510,787. In Great Britain November 6, 1942

Section 1, Public Law 690, August 8, 1946
Patent expires November 6, 1962

6 Claims. (Cl. 106—182)

This invention is concerned with new compositions of matter having a basis of cellulose acetate or other cellulose esters or ethers and with articles formed of such compositions, for example, fibres, foils, and films.

When fibres, foils, and similar products having a basis of cellulose acetate or other cellulose ester or ether are exposed for a substantial period to the action of ultra-violet light they undergo, in general and in company with fibres, foils, and the like of other materials (e. g. fibres of cotton or regenerated cellulose) a marked loss of tensile strength. This latter is usually accompanied by a reduction in the intrinsic viscosity of the material of the fibres, foils, and the like.

It has now been found that this undesirable action of ultra-violet light on cellulose acetate or other cellulose ester or ether, or compositions having a basic of such esters or ethers (including articles formed of such esters or ethers or compositions), can be very greatly reduced by including in the cellulose ester or ether or compositions an ester of an aromatic hydroxy carboxylic acid and particularly an ester of an aromatic hydroxy mono-carboxylic acid. This advantageous effect can be secured with a quite small proportion of the aromatic hydroxy carboxylic acid, for example with 15% or less (based on the weight of the cellulose ester or ether). Usually good results are obtained with from 1% to 10%, e. g. 5%. For example a film (0.002 inch thick) of cellulose acetate containing about 5% of phenyl salicylate or beta-naphthyl salicylate on the weight of the cellulose acetate suffers, on exposure to light from a mercury vapour lamp, a percentage loss in strength of only about one eighth of that of a similar film free from the salicylate.

The esters of aromatic hydroxy carboxylic acids employed are preferably those of hydroxy benzene or hydroxy naphthalene mono-carboxylic acids. Examples of the hydroxybenzene carboxylic acids are p-hydroxybenzoic acid and salicylic acid, while examples of the hydroxynaphthoic acids are 2-hydroxynaphthalene-3-carboxylic acid, and 1-hydroxynaphthalene-2-carboxylic acid. The hydroxyl group of the acid can be esterified with a carboxylic acid, for example a lower fatty acid such as acetic acid or an aromatic acid such as benzoic acid.

The esters of the hydroxy carboxylic acids can be those of either alcohols or phenols. For example they can be those of aliphatic hydroxy compounds (for instance fatty alcohols e. g. ethyl alcohol, butyl alcohols, amyl alcohols and octyl alcohols), cyclo-aliphatic alcohols (for instance cyclo hexanol, methyl-cyclo-hexanol, and menthol), alcohols containing an aromatic nucleus (for instance benzyl alcohol and beta-phenylethyl-alcohols). Again they can be esters of phenols. For example they can be esters of hydroxybenzenes for instance phenol itself, homologues of phenol, mono-ethers of dihydroxybenzenes, hydroxy-diphenyls e. g. p-hydroxy-diphenyl, and hydroxy-diphenylmethanes e. g. 4:4'-dihydroxy-diphenylmethane. Likewise they can be esters of hydroxynaphthalenes for instance alpha- or beta-naphthol and 4-methoxy-1-hydroxy-naphthalene.

The esters of the hydroxy aromatic carboxylic acids employed are advantageously colourless when in solution and of such low volatility that they are not lost from the cellulose ester or ether to a substantive extent during normal storage or use of the products. One method of testing the suitability of the esters from this point of view is to place say one gram of the ester in a dish and heat in the air at 60 to 70° C. for several hours and determine the loss of ester by weighing. Preferably esters are employed which do not lose more than about 5% in weight when heated for 20 hours under the conditions indicated above. In the appended claims "ester of low volatility" means an ester which does not lose more than 5% of its weight when subjected to this test. Tested under these conditions phenyl salicylate undergoes loss of about 7%, and benzyl salicylate and the ethyl ester of benzoyl salicylic acid about 3%, while beta-naphthyl salicylate undergoes substantially no loss.

Specific esters of aromatic hydroxy carboxylic acids which can be used in the compositions of the invention are, in addition to the phenyl and beta-naphthyl esters of salicylic acid referred to above, benzyl salicylate, menthyl salicylate, beta-phenylethyl salicylate, salicylate of p-hydroxydiphenyl, ethyl ester of benzoyl salicylic acid, and the phenyl ester of 1-hydroxynaphthalene-2-carboxylic acid or of 2-hydroxynaphthalene-3-carboxylic acid or of 2-acetoxynaphthalene-3-carboxylic acid.

The new compositions can, as indicated above, be in the form of fibres, foils, films or other shaped articles.

The incorporation of the ester of the aromatic carboxylic acid with the cellulose ester or ether can be effected in various ways, for example in any of the ways used for incorporating plasticisers with cellulose esters or ethers. Thus the cellulose ester or ether and the ester of an aromatic carboxylic acid can be dissolved in a common volatile solvent. For instance in the case of cellulose acetate acetone may be used or a mixture of acetone with diacetone alcohol. The solutions so obtained can then be spun into fibres, e. g. by dry spinning methods, or cast into foils or films and the solvent evaporated, or used as a lacquer for the production of coatings on textiles, wood, metal, or other materials. Again, the cellulose ester or ether, for example as textile fibres, whether loose fibres or in the form of yarns or fabrics, may be allowed to absorb the ester of the aromatic carboxylic acid from an aqueous dispersion of the latter or may be impregnated with a solution of the ester of the aromatic carboxylic acid in a liquid which is not a solvent for the cellulose ester or ether, but advantageously is a swelling therefor, and the liquid then evaporated. For instance the ester can be incorporated in cellulose acetate textile material by impregnating the latter with a solution of the ester in aqueous ethyl alcohol, for instance aqueous ethyl alcohol of 70 to 90% strength by weight, e. g. ethyl alcohol in the form of methylated spirit. Solutions in aqueous propyl or isopropyl alcohol can likewise be employed.

The esters of aromatic carboxylic acids employed have as a rule some plasticizing action on the cellulose ester or ether. Other plasticizers may be incorporated in the compositions according to the precise properties it is desired to impart thereto. Again still other materials may be included therein, for example filling materials or colouring matters.

The cellulose derivative of the compositions can be cellulose acetate as mentioned above. Again it can be cellulose propionate, butyrate, or acetate-butyrate, or a cellulose ether, for instance ethyl or benzyl cellulose.

The invention is illustrated by the following examples.

Example I

A cellulose acetate dope of the following composition is prepared:

| | |
|---|---|
| Beta-naphthyl salicylate _____grams__ | 0.75 |
| Cellulose acetate _____do____ | 15.0 |
| Acetone _____cubic centimeters__ | 90.0 |
| Diacetone alcohol _____do____ | 10.0 |

This dope is then cast on a film casting surface of metal or glass and the volatile solvent evaporated so that a film of from 0.001 to 0.003 inch in thickness is obtained. The films so produced lose very little tensile strength when exposed to ultra-violet light from a quartz mercury vapour lamp under conditions which reduce by 90% the tensile strength of a film prepared in a similar manner but without the beta-naphthyl salicylate. Moreover the films do not become discoloured by the exposure to the ultra-violet light.

Similiar results are obtained by substituting phenyl salicylate for the beta-naphthyl salicylate.

Example II

A cellulose acetate fabric is padded on a padding mangle at ordinary temperature with a 25 gms. per litre solution of phenyl salicylate or beta-naphthyl-salicylate in methylated spirit, the expression being such that the fabric retains about its own weight of the solution. The padded material is then dried. As compared with untreated fabric it suffers very little loss of tensile strength when exposed to the action of ultra-violet light.

Having described my invention, what I desire to secure by Letters Patent is:

1. A composition of matter consisting essentially of cellulose acetate and, to reduce the destructive action of ultra-violet light on the cellulose acetate, from 1–10% of beta-naphthyl salicylate based on the weight of the cellulose acetate.

2. Fibers having a basis of a cellulose derivative, selected from the group consisting of cellulose esters and cellulose ethers, containing, to reduce the destructive action of ultra-violet light on the cellulose derivative, an ester of mono-hydroxy-naphthalene with an aromatic mono-hydroxy-mono-carboxylic-naphthalene with a hydroxy-carboxylic acid in which the hydroxyl group and the carboxyl group are directly attached to an aromatic nucleus selected from the group consisting of benzene nuclei and naphthalene nuclei, the proportion of said ester being from 1% to 10%, based on the weight of the cellulose derivative.

3. Cellulose acetate fibers containing, to reduce the destructive action of ultra-violet light on the cellulose acetate, an ester of a mono-hydroxy-naphthalene with an aromatic mono-hydroxy-mono-carboxylic acid in which the hydroxyl group and the carboxyl group are directly attached to an aromatic nucleus selected from the group consisting of benzene nuclei and naphthalene nuclei, the proportion of said ester being from 1% to 10%, based on the weight of the cellulose acetate.

4. A composition of matter consisting essentially of a cellulose derivative selected from the group consisting of cellulose esters and cellulose ethers, and, to reduce the destructive action of ultra-violet light on the cellulose derivative, an ester of a mono-hydroxy-naphthalene with an aromatic mono-hydroxy-mono-carboxylic acid in which the hydroxyl group and the carboxyl group are directly attached to an aromatic nucleus selected from the group consisting of benzene nuclei and naphthalene nuclei, the proportion of said ester being from 1% to 10%, based on the weight of the cellulose derivative.

5. A composition of matter consisting essentially of cellulose acetate, and, to reduce the destructive action of ultra-violet light on the cellulose acetate, an ester of a mono-hydroxy-naphthalene with an aromatic mono-hydroxy-mono-carboxylic acid in which the hydroxyl group and the carboxyl group are directly attached to an aromatic nucleus selected from the group consisting of benzene nuclei and naphthalene nuclei, the proportion of said ester being from 1% to 10%, based on the weight of the cellulose acetate.

6. Cellulose acetate fibers containing, to reduce the destructive action of ultra-violet light on the cellulose acetate, from 1% to 10% of beta-naphthyl salicylate based on the weight of the cellulose acetate.

HENRY DREYFUS.

REFERENCES CITED

The following references are of record in the file of this patent:

UNITED STATES PATENTS

| Number | Name | Date |
|---|---|---|
| 1,193,178 | Mork et al. | Aug. 1, 1916 |
| 1,319,229 | Lindsay | Oct. 21, 1919 |
| 1,395,905 | Clarke | Nov. 1, 1921 |
| 1,408,095 | Kessler | Feb. 28, 1922 |
| 1,815,655 | Matheson | July 21, 1931 |
| 2,086,418 | Hunt et al. | July 6, 1937 |
| 2,175,101 | Albrecht | Oct. 3, 1939 |
| 2,333,577 | Koch | Nov. 2, 1943 |
| 2,392,361 | Britton et al. | Jan. 8, 1946 |

FOREIGN PATENTS

| Number | Country | Date |
|---|---|---|
| 524,897 | Great Britain | Aug. 16, 1940 |

Certificate of Correction

Patent No. 2,432,517.  December 16, 1947.

HENRY DREYFUS, DECEASED

It is hereby certified that errors appear in the printed specification of the above numbered patent requiring correction as follows: Column 4, line 3, claim 2, after "ester of" insert *a*; lines 5 and 6, same claim, strike out the hyphen and words "-naphthalene with a hydroxy-carboxylic"; for the claims now numbered "1", "2", "3", "4", and "5" read *3, 4, 5, 1,* and *2,* respectively; and that the said Letters Patent should be read with these corrections therein that the same may conform to the record of the case in the Patent Office.

Signed and sealed this 20th day of April, A. D. 1948.

[SEAL]

THOMAS F. MURPHY,
*Assistant Commissioner of Patents.*